United States Patent
Kamikado et al.

(10) Patent No.: US 6,777,504 B2
(45) Date of Patent: Aug. 17, 2004

(54) ADVANCED BISPHENOL AND OXYALKYLENE DIEPOXIDES REACTED WITH CYCLIC ESTER, AMINE AND BLOCKED ISOCYANATE

(75) Inventors: Koji Kamikado, Yokohama (JP); Reiziro Nishida, Chigasaki (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 0 days.

(21) Appl. No.: 10/145,697

(22) Filed: May 16, 2002

(65) Prior Publication Data

US 2002/0177674 A1 Nov. 28, 2002

Related U.S. Application Data

(62) Division of application No. 09/497,731, filed on Feb. 4, 2000, now abandoned.

(30) Foreign Application Priority Data

Feb. 5, 1999 (JP) .............................................. 11-28722

(51) Int. Cl.[7] ......................... B32B 15/08; B32B 27/38; C08L 63/02
(52) U.S. Cl. ....................... 525/524; 428/413; 428/418; 523/404
(58) Field of Search ................................. 428/418, 413; 523/414, 404; 525/524

(56) References Cited

U.S. PATENT DOCUMENTS

| 4,522,984 A | 6/1985 | Watanabe et al. ............ 525/533 |
| 4,829,105 A | 5/1989 | Yamada et al. ............. 525/533 |
| 4,872,961 A | 10/1989 | McIntyre et al. ............ 524/901 |
| 5,126,413 A | 6/1992 | Kamikado et al. ........... 525/533 |
| 5,225,461 A | 7/1993 | Kamikado et al. ........... 525/528 |
| 5,770,642 A | 6/1998 | Kanato et al. .............. 523/404 |

FOREIGN PATENT DOCUMENTS

| EP | 0 636 667 | 2/1995 |
| EP | 0 696 624 | 2/1996 |
| JP | 3-28857 | 2/1991 |

*Primary Examiner*—Robert Sellers
(74) *Attorney, Agent, or Firm*—Wenderoth, Lind & Ponack, L.L.P.

(57) ABSTRACT

The present invention provides a resin composition for coating, capable of forming a coating film excellent in electrodeposition property, coating surface smoothness and anticorrosivity in spite of small content of organic solvent and without containing a lead compound, and comprising a modified epoxy-polyamine resin (f), obtained by first reacting a diepoxide compound (a), wherein a specified amount of alkylene oxide has been introduced, and a bisphenol A type epoxy resin of an epoxy equivalent 170–500 with a bisphenol (b), reacting the epoxy resin (c) thus obtained with a cyclic ester (d), and further reacting the modified epoxy resin (e) thus obtained with an amine compound having active hydrogen.

5 Claims, No Drawings

ADVANCED BISPHENOL AND OXYALKYLENE DIEPOXIDES REACTED WITH CYCLIC ESTER, AMINE AND BLOCKED ISOCYANATE

This application is a divisional application of Ser. No. 09/497,731 filed Feb. 4, 2000, abandoned.

The present invention relates to a resin composition for coating and more specifically relates to a resin composition for cationic electrodeposition paint capable of forming a coating film excellent in electrodeposition property, coating surface smoothness and anticorrosivity in spite of small content of organic solvent and without containing a lead compound.

Electrodeposition paint is being used as undercoat paint for motorcar and for other wide range of application and products with various features have been developed hitherto. Particularly cationic electrodeposition paints, containing as base resin an epoxy resin containing an amino group as solubilizing group and an epoxy resin solubilized by a quaternary ammonium salt group etc., have been widely used due to its excellent anticorrosivity, throwing power etc., replacing conventional anionic electrodeposition paints.

These cationic electrodeposition paints are generally water-based paints, but usually an organic solvent is used together in order to secure the electrodeposition property and coating surface smoothness. Further, a lead compound is compounded in order to secure the anticorrosivity. Though an organic solvent plays an important role at the time of an electrodeposited film formation, it is desirable to reduce its amount to the utmost from the viewpoint of VOC (volatile organic compounds). Moreover, a lead compound is a very harmful substance and its usage is problematic in the counter-measures against public pollution.

The main purpose of the present invention is to provide a resin composition for cationic electrodeposition paint without defects as mentioned above and excellent in coating film properties such as anticorrosivity, coating surface smoothness etc. with low content of organic solvent and without containing a lead compound.

Means of Solving the Problems

The present inventors have been conducting an intensive research in order to solve the problems a cationic electrodeposition paint has as mentioned above. As a result, this time, they have found out that the above-mentioned purpose could be achieved by using as base resin a resin obtained by reacting an epoxy resin, in which a prescribed amount of alkylene oxide has been introduced, with a cyclic ester and have completed the present invention.

Thus, according to the present invention, there is provided a resin composition for coating comprising a modified epoxy-polyamine resin (f), obtained by first reacting a diepoxide compound (a) selected from the group consisting of the compounds represented by the following general formulae (I) and (II)

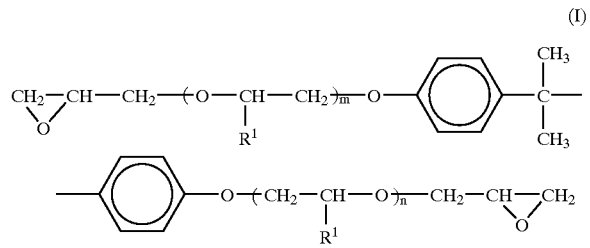

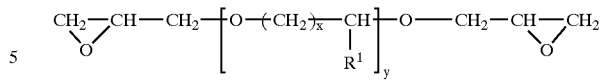

wherein $R^1$ represents a hydrogen atom or an alkyl group of 1–6 carbon atoms, m and n are respectively a number of 0 or more, and the sum of m and n is in the range of 1–20, x is an integer of 1–9, y is a number of 1–50, and a bisphenol A type epoxy resin of an epoxy equivalent 170–500 with a bisphenol (b), reacting the epoxy resin (c) thus obtained with a cyclic ester (d) represented by the following general formula (III)

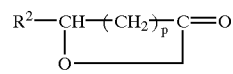

wherein $R^2$ represents a hydrogen atom or a methyl group, p is an integer of 3–6, and further reacting an amine compound having an active hydrogen to the modified epoxy resin (e) thus obtained.

The resin composition for coating of the present invention will be described hereinafter in more detail.

The diepoxide compound of the aforementioned formula (I) used as the component (a) in the present invention can be prepared, for example, by adding an alkylene oxide represented by the following formula (IV)

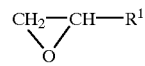

wherein $R^1$ has the aforementioned meaning, to bisphenol A according to a per se known process, and diepoxidizing by reacting the obtained polyether compound of hydroxyl terminal further with epihalohydrin. As an alkylene oxide of the above-mentioned formula (IV) used here there are mentioned, for example, an alkylene oxide of 2–8 carbon atoms such as ethylene oxide, propylene oxide, butylene oxide etc. and, above all, propylene oxide (the compound of the formula (IV) wherein $R^1$ is methyl) is preferred.

The addition mole number of alkylene oxide in the formula (I), namely, the number of the repeating unit of the alkylene oxide structure part m and n are respectively numbers of 0 or more, preferably in the range of 1–10, and the sum of m and n (m+n) can be a number in the range of 1–20, preferably 2–10.

The diepoxide compound of the aforementioned formula (II) as the component (a) can be prepared, for example, according to per se known processes, (i) by diepoxidizing by reacting epihalo-hydrin to the polyalkylene oxide of hydroxyl terminal obtained by ring-opening polymerization of an alkylene oxide of the aforementioned formula (IV) by using an alkylene glycol as mentioned below as initiator; or (ii) by diepoxidizing by reacting epihalohydrin to an alkylene glycol represented by the following formula (V)

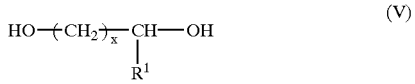

wherein R¹ and x have the aforementioned meaning, or a polyether diol obtained by dehydrating condensation of 2 or more molecules of said alkylene glycol. As an alkylene glycol of the above-mentioned formula (V) used here there are mentioned alkylene glycols of 2–10 carbon atoms such as ethylene glycol, propylene glycol, trimethylene glycol, 1,4-butanediol, 1,3-butanediol, 1,5-pentanediol, 1,6-hexanediol, 1,8-octanediol etc.

In the above-mentioned formula (V) x can be an integer in the range of 1–9, preferably 1–6, and the number of the repeating unit of the alkylene oxide or alkylene glycol structure part y in the aforementioned formula (II) can be a number in the range of 1–50, preferably 5–20.

According to the present invention an epoxy resin (c) is prepared first by reacting a bisphenol (b) with the above-mentioned diepoxide compound (a) combined with a bisphenol A type epoxy resin of an epoxy equivalent 170–500.

Here "bisphenol A type epoxy resin of an epoxy equivalent 170–500" to be combined with the diepoxide compound (a) and reacted with a bisphenol (b) includes substances of relatively low molecular weight having 2 or more epoxy groups in the molecule, obtained by reaction of bisphenol A and epihalohydrin, representatively represented by the following formula (VI)

and there are mentioned specifically, for example, bis(4-hydroxyphenyl)-2,2-propane (bisphenol A), bis(4-hydroxyphenyl)-1,1-ethane, bis(4-hydroxyphenyl)-methane (bisphenol F) etc. Among them, particularly bisphenol A is preferred.

The reaction of the diepoxide compound (a) and bisphenol A type epoxy resin with a bisphenol (b) can be conducted by heating to a temperature of about 100–about 200° C., preferably about 120–about 170° C., usually without using a solvent, in an atmosphere of an inert gas such as nitrogen gas etc., suitably in the presence of a catalyst such as a tertiary amine like dimethylbenzylamine, tributyl-amine etc.; a quaternary ammonium salt like tetraethylammonium bromide etc. Said reaction is conducted until the epoxy equivalent of the formed epoxy resin (c) reaches in the range of 400–5000, particularly 500–2000.

The application ratio of the diepoxide compound (a), bisphenol A type epoxy resin and a bisphenol (b) is not strictly limited but can be varied according to the kinds of these components to be used etc. The diepoxide compound (a) is preferably used in the range of generally 5–50% by weight, particularly 10–40% by weight based upon the total solid content of the above-mentioned three components including it. The application ratio of the bisphenol A type epoxy resin and a bisphenol (b) can be in the range of generally 50–95% by weight, particularly 60–80% by weight of the bisphenol A type epoxy resin and 50–5% by weight, particularly 40–20% by weight of a bisphenol (b) based upon the total solid content of these two components.

The epoxy resin (c) thus obtained can have a number-average molecular weight in the range of usually 800–10000, particularly 1000–4000.

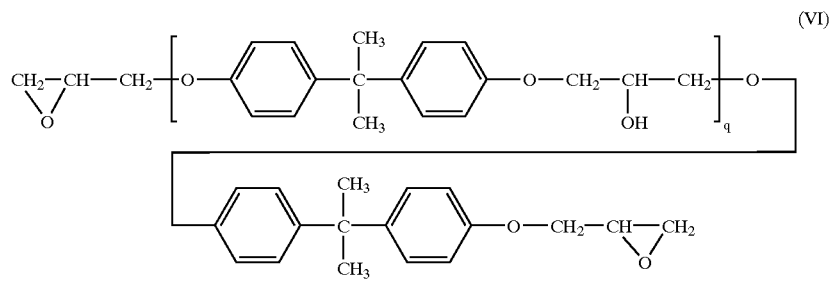

wherein q is a number in the range of 0–5, preferably 0–3.

Said bisphenol A type epoxy resin can have an epoxy equilavent in the range of 170–500, preferably 200–400 and a number-average molecular weight in the range of 340–1500, preferably 400–1000.

On the other hand, a bisphenol (b) to be reacted with the above-mentioned diepoxide compound (a) and a bisphenol A type epoxy resin includes compounds represented by the following general formula (VII)

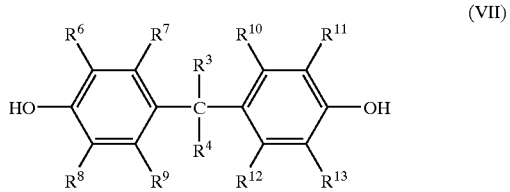

wherein
R³ and R⁴ each represents a hydrogen atom, an alkyl group of 1–6 carbon atoms, or a trifluoromethyl group, R⁶, R⁷, R⁸, R⁹, R¹⁰, R¹¹, R¹² and R¹³ each represents a hydrogen atom or an alkyl group of 1–6 carbon atoms, Said epoxy resin (c) is then subjected to react with a cyclic ester (d) of the aforementioned formula (III). As the cyclic ester (d) used here there are mentioned, for example, δ-valerolactone, ε-caprolactone, ξ-enalactone, η-caprolactone, γ-valerolactone, δ-caprolactone, ε-enalactone, ξ-caprylolactone etc. and particularly cyclic ester compounds, wherein the number of carbon atoms is 6–8, namely, p is an integer of 4–6, and R² is a hydrogen atom, are preferred.

In the above-mentioned reaction of the epoxy resin (c) and the cyclic ester (d), the cyclic ester (d) opens its ring and reacts with a secondary hydroxyl group in the epoxy resin (c) to form a highly active primary hydroxyl group, while the methylene chain part originated from the lactone is estimated to give flexibility and functionality to the epoxy resin (c).

The amount of the cyclic ester (d) to be reacted with the epoxy resin (c) is not strictly limited but there is generally preferred an amount which gives the content (solid content) of the structural unit originated from said cyclic ester in the modified epoxy resin (e) obtained by this reaction in the range of 1–50% by weight, particularly 5–20% by weight.

The reaction of the epoxy resin (c) and the cyclic ester (d) can be conducted at a temperature of about 120–about 200°

C., preferably about 150–about 180° C., usually without using a solvent, optionally in air or in an inert atmosphere such as nitrogen etc., suitably in the presence of a catalyst such as dibutyltin oxide, dioctyltin oxide, tetrabutyl titanate etc. Said reaction can be terminated at the point when the reaction rate of the cyclic ester (d) reached over 90%, preferably over 95%, checked by persuing the amount of the unreacted cyclic ester (d) with infrared absorption spectrum measurement of the reaction mixture samples periodically taken.

According to the present invention, the lactone-modified epoxy resin (e) thus obtained is further subjected to react with an amine compound having active hydrogen.

As said amine compound having active hydrogen there are mentioned, for example, primary monoamine compounds such as alkylamines like methylamine, ethylamine, n-propylamine, isopro-pylamine etc. and alkanolamines like ethanolamine, n-propanolamine, isopropanolamine etc.; secondary monoamine compounds such as dialkylamines like diethylamine, di-n-butylamine, di-n-pro-pylamine etc., dialkanolamines like diethanolamine, di-n-propanolamine, diisopropanolamine etc. and N-alkylalkanolamines like N-methylethanolamine, N-ethylethanolamine etc.; primary and/or secondary polyamine compounds such as alkylenediamines like ethylenediamine etc., polyalkylenepolyamines like diethylenetriamine etc., hydroxyalkylaminoalkylamines like hydroxyethylaminoethylamine etc., mono- or dialkylaminoalkylamines like ethylaminoethylamine, methylaminopropylamine, dimethylaminoethylamine, dimethylaminopropylamine etc. Among them, particularly diethanolamine and N-methylethanolamine are preferred.

Such an amine compound can be converted into an objective modified epoxy-polyamine resin (f) by reacting as such with the aforementioned lactone-modified epoxy resin (e), preferably in an organic solvent of ketone type, ester type, alcohol type, for example, methyl ethyl ketone, methyl isobutyl ketone, butyl cellosolve, butanol etc., at a temperature of about 30–about 150, particularly about 80–about 120 for some 1–5 hours. In case of using a primary amine or a secondary amine having N-hydroxyalkyl group as the amine compound, however, it is generally desirable to prepare an objective modified epoxy-polyamine resin (f) by reacting such an amine, after converting into an aldimine, ketimine, oxazoline or imidazoline by previously reacting, according to a usual process, with a ketone, aldehyde or carboxylic acid through heating to a temperature of, for example, about 100–about 230, with the lactone-modified epoxy resin (e), for example, preferably in an organic solvent as aforementioned, at a temperature of about 80–about 200, particularly about 80–about 120 for some 1–5 hours.

The application amount of the amine compound to the lactone-modified epoxy resin (e) in the above-mentioned reaction is not strictly limited but can be varied according to the kind of said lactone-modified epoxy resin or the properties required for the objective product, the modified epoxy-polyamine resin. Generally, however, there is desirable such an amount as to give an amine value in the range of 15–100, particularly 20–70 to the final product, the modified epoxy-polyamine resin (f), There is observed such a tendency that if the amine value of the modified epoxy-polyamine resin (f) is smaller than 15, the water-dispersibility of said resin is lowered, and if it is bigger than 100, the water resistance of the coating film formed by using said resin is deteriorated.

The modified epoxy-polyamine resin (f) prepared as mentioned above can contain the alkylene oxide or alkylene glycol structural units originated from the diepoxide compounds (a) of the afore-mentioned formulae (I) or (II) in the range of generally 3–40% by weight, preferably 5–20% by weight.

Further, the modified epoxy-polyamine resin (f) according to the present invention can contain the structural units originated from the aforementioned cyclic ester (d) in the range of generally 5–30% by weight, preferably 5–20% by weight.

Furthermore, the modified epoxy-polyamine resin (f) can have a number-average molecular weight in the range of usually 1000–20000, preferably 1500–10000 and, as aforementioned, has preferably an amine value in the range of 15–100, particularly 20–70.

According to another embodiment of the present invention, a diepoxide compound (a) and bisphenol A type epoxy resin are reacted with a bisphenol (b) as aforementioned and the obtained epoxy resin (c) is reacted with a cyclic ester (d) to form a lactone-modified epoxy resin (e), which is then reacted with a partially blocked isocyanate compound (h), before it is reacted with an amine compound having active hydrogen, and then can be converted into the objective modified epoxy-polyamine resin (f) by reacting with the amine compound (h) having active hydrogen.

The partially blocked polyisocyanate compound (h) used in the above-mentioned embodiment has a blocking rate in the range of 20–80%, preferably 40–70% and such a partially blocked polyisocyanate compound can be obtained, for example, by reacting a polyisocyanate compound and an isocyanate blocking agent in such a proportion that the ratio of the number of isocyanate groups in the polyisocyanate compound/the number of active hydrogen in the isocyanate blocking agent would be in the range of 1/0.5–1/0.95, preferably 1/0.6–1/0.9.

The "blocking rate" here means the ratio of the blocked isocyanate groups after the reaction to the number of total isocyanate groups in the polyisocyanate compound before the reaction, in case the isocyanate groups in the polyisocyanate compound are reacted with active hydrogen in the blocking agent.

A polyisocyanate compound is a compound having at least two isocyanate groups in the molecule and as specific examples there are mentioned, for example, aliphatic and alicyclic polyisocyanate compounds such as hexamethylene diisocyanate, isophorone diisocyanate, hydrogenated diphenylmethane diisocyanate etc.; aromatic polyisocyanates such as tolylene diisocyanate, diphenylmethane-4,4'-diisocyanate etc. and above all, isophorone diisocyanate and diphenylmethane-4,4'-diisocyanate are preferred. They can be used singly or in combination of two kinds or more.

On the other hand, an isocyanate blocking agent is an active hydrogen-containing compound having a function to temporarily add and block the isocyanate group in a polyisocyanate compound and the partially blocked isocyanate compound (h) formed by said addition can be a substance that is stable at normal temperature and capable of reproducing a free isocyanate group by dissociating a blocking agent when heated to about 140° C.–about 250° C.

As a blocking agent meeting such requirements there are mentioned, for example, lactam type compounds such as ε-caprolactam, γ-butyrolactam etc.; oxime type compounds such as methyl ethyl ketoxime, cyclohexanone oxime etc.; phenol type compounds such as phenol, p-t-butylphenol, cresol etc.; aliphatic alcohols such as n-butanol, 2-ethylhexanol etc.; aromatic alkyl alcohols such as phenyl carbinol, methyl phenyl carbinol etc.; ether alcohol type compounds such as ethylene glycol monobutyl ether etc.

The reaction ratio of the above-mentioned partially blocked isocyanate compound (h) and the modified epoxy resin (e) can be in the range of generally 1/20–1/1, preferably 1/10–1/2.5 as solid content ratio of compound (h)/resin (e).

The reaction of the partially blocked isocyanate compound (h) and the modified epoxy resin (e) can be conducted, for example, by reacting these two components preferably in an organic solvent such as ketone type like methyl ethyl ketone, methyl isobutyl ketone etc.; hydrocarbon type like xylene, toluene etc. at a temperature of about 50–about 120° C. until no free isocyanate group is substantially detected.

According to yet another embodiment of the present invention, a diepoxide compound (a) and bisphenol A type epoxy resin are reacted with a bisphenol (b) as aforementioned and the obtained epoxy resin (c) is reacted with a cyclic ester (d) into a lactone-modified epoxy resin (e), which is reacted with an amine compound having active hydrogen and the obtained modified epoxy-polyamine resin (f) is further reacted with a partially blocked isocyanate compound (h) as mentioned above to obtain a urethane-modified epoxy-polyamine resin (g).

The reaction ratio of the partially blocked isocyanate compound (h) and the modified epoxy-polyamine resin (f) can be in the range of generally 1/20–1/1, preferably 1/10–1/2.5 as solid content ratio of compound (h)/resin (f).

The reaction of the partially blocked isocyanate compound (h) and the modified epoxy-polyamine resin (f) can be conducted, for example, under the similar conditions as aforementioned about the reaction of the partially blocked isocyanate compound (h) and the modified epoxy resin (e).

The modified epoxy-polyamine resin (f) and the urethane-modified epoxy-polyamine resin (g) obtained as mentioned above have advantages that they can be electrodeposition-coated without lowering the electrodeposition properties even under low organic solvent or without organic solvent, because they have a structure in which a plastic component alkylene oxide (or alkylene glycol) structural unit and a hard bisphenol structural unit are repeated at a relatively short interval in the molecule, and that they can form a coating film having sufficient anticorrosivity without compounding a lead compound, because they have highly active primary hydroxyl group originated from a cyclic ester in the side chain. Therefore the modified epoxy-polyamine resin (f) and the urethane-modified epoxy-polyamine resin (g) can be favorably used as a resin composition for coating, particularly a base resin component in a resin composition for cationic electrodeposition paint.

In case of using the modified epoxy-polyamine resin (f) or the urethane-modified epoxy-polyamine resin (g) in a resin composition for coating, these resins can be used with an outer crosslinking agent together. As an outer crosslinking agent usable together there can be mentioned, compounds having at least two crosslinking functional groups (for example, blocked isocyanate group), which can react with a reactive functional group (for example, primary or secondary hydroxyl group) in the above-mentioned resins, in the molecule, for example, blocked polyisocyanate compounds, β-hydroxycarbamic acid esters of polyamine, malonic acid ester derivatives, methylolized melamine, methylolized urea etc.

The compounding ratio (solid content ratio) of the modified epoxy-polyamine resin (f) or the urethane-modified epoxy-polyamine resin (g) and such an outer crosslinking agent is preferably in the range of usually 100/0–60/40, particularly 90/10–60/40.

The resin composition according to the present invention comprising the modified epoxy-polyamine resin (f) or the urethane-modified epoxy-polyamine resin (g) can be favorably used for the preparation of a cationic electrodeposition coating bath as a resin for cationic electrodeposition paint. The preparation can be conducted by a per se known method, for example, by neutralizing such a resin, using a suitable acid, for example, an inorganic acid such as boric acid, phosphoric acid, sulfuric acid, hydrochloric acid etc.; or an organic acid such as lactic acid, acetic acid, formic acid etc. singly or in combination of two or more, dissolving or dispersing stably in water by adding water while sufficiently stirring and mixing, and then kneading, as necessary, color pigment such as carbon black, titanium white, iron oxide red etc.; extender pigment such as clay, talc etc.; anticorrosive pigment such as strontium chromate etc.; or further other additives. As other compoundable additives there are mentioned, for example, a small amount of nonionic surface-active agent as dispersant or cissing-preventing agent for the coating surface; curing accelerater (for example, salts of metals such as bismuth, tin, zinc, iron, aluminium etc. and/or imidazoline compounds, imidazoles, phosphines, quaternary phosphonium salts) etc.

A cured coating film having excellent coating film performances can be obtained by conducting an electrodeposition coating by a similar method in a usual cationic electrodeposition coating, using the cationic electrodeposition coating bath prepared as mentioned above and an electroconductive substrate as cathode, and after washing with water, by baking at a temperature of about 150–about 200° C. for about 10 minutes–about 40 minutes.

Thus the resin composition for coating provided by the present invention can be widely used, for example, in the field of undercoating of motorcar body, coating of industrial parts, electric appliances etc.

The present invention will be described hereinafter more specifically with Examples. "Parts" and "%" simply mentioned mean "parts by weight" and "% by weight" respectively.

PREPARATION EXAMPLE 1

In a flask equipped with a stirrer, thermometer, nitrogen inlet pipe and reflux cooler were placed 340 parts of propylene oxide-modified bisphenol A diglycidyl ether with an epoxy equivalent of about 340 and total addition mole number of propylene oxide of 2–3, 342 parts of bisphenol A, 570 parts of bisphenol A diglycidyl ether with an epoxy equivalent of about 190 and 0.35 parts of dimethylbenzylamine and reacted at 160° C. until the epoxy equivalent reached 1,252. Then 125 parts of ε-caprolactone and 0.025 parts of tetrabutoxytitanium were added, raised the temperature to 170° C. and at the point where the reaction rate exceeded 98%, detected by persuing the unreacted ε-caprolactone amount by infrared absorption spectrum measurement of samples periodically taken while keeping the temperature, 241.2 parts of methyl isobutyl ketone, 84 parts of diethanolamine and 53.4 parts of methyl isobutyl ketone solution of methyl isobutyl ketone diketimine of diethylenetriamine of 80% purity were added, reacted at 80° C. for 4 hours and then diluted with 250 parts of methyl isobutyl ketone to obtain a modified epoxy-polyamine resin with resin solid content of 75% and amine value of 44.4.

PREPARATION EXAMPLE 2

In a flask equipped with a stirrer, thermometer, nitrogen inlet pipe and reflux cooler were placed 300 parts of polypropylene oxide diglycidyl ether with an epoxy equivalent of about 300, 285 parts of bisphenol A, 570 parts of bisphenol A diglycidyl ether with an epoxy equivalent of about 190 and 0.3 parts of dimethylbenzylamine and reacted at 160° C. until the epoxy equivalent reached 955.3. Then 100 parts of ε-caprolactone and 0.02 parts of tetrabutoxytitanium were added, raised the temperature to 170° C. and at the point where the reaction rate exceeded 98%, detected by persuing the unreacted ε-caprolactone amount by inferred absorption spectrum measurement of samples periodically taken while keeping the temperature, 200 parts of methyl isobutyl ketone, 84 parts of diethanolamine and 53.4 parts of methyl isobutyl ketone solution of methyl isobutyl ketone diketimine of diethylenetriamine of 80% purity were added, reacted at 80° C. for 4 hours and then diluted with 200 parts of methyl isobutyl ketone to obtain a modified epoxy-polyamine resin with resin solid content of 75% and amine value of 54.2.

PREPARATION EXAMPLE 3

In a flask equipped with a stirrer, thermometer, nitrogen inlet pipe and reflux cooler were placed 200 parts of tolylene diisocyanate to which 149.4 parts of 2-ethylhexanol were slowly added drop by drop while cooling to keep the reaction temperature at 80–100° C. to synthesize a blocked isocyanate.

PREPARATION EXAMPLE 4

In a flask equipped with a stirrer, thermometer, nitrogen inlet pipe and reflux cooler were placed 340 parts of propylene oxide-modified bisphenol A diglycidyl ether with an epoxy equivalent of about 340 and total addition mole number of propylene oxide of 2–3, 228 parts of bisphenol A, 390 parts of bisphenol A diglycidyl ether with an epoxy equivalent of about 190 and 0.3 parts of dimethylbenzylamine and reacted at 160° C. until the epoxy equivalent reached 958. Then 100 parts of ε-caprolactone and 0.02 parts of tetrabutoxytitanium were added, raised the temperature to 170° C. and at the point where the reaction rate exceeded 98%, detected by persuing the unreacted ε-caprolactone amount by infrared absorption spectrum measurement of samples periodically taken while keeping the temperature, 241.1 parts of methyl isobutyl ketone were placed and then 152 parts of the blocked isocyanate obtained in Preparation Example 3 were added, and, after reacting at 100° C. under the nitrogen stream until the aborption of isocyanate group by infrared absorption spectrum measurement disappeared, 84 parts of diethanolamine and 53.4 parts of methyl isobutyl ketone solution of methyl isobutyl ketone diketimine of diethylenetriamine of 80% purity were added, reacted at 80° C. for 4 hours and then diluted with 194.2 parts of methyl isobutyl ketone to obtain a urethane-modified epoxy-polyamine resin with resin solid content of 75% and amine value of 50.0.

PREPARATION EXAMPLE 5

In a flask equipped with a stirrer, thermometer, nitrogen inlet pipe and reflux cooler were placed 285 parts of bisphenol A, 665 parts of bisphenol A diglycidyl ether with an epoxy equivalent of about 190 and 0.35 parts of dimethylbenzylamine and reacted at 160° C. until the epoxy equivalent reached 950. Then 100 parts of ε-caprolactone and 0.02 parts of tetrabutoxytitanium were added, raised the temperature to 170° C. and at the point where the reaction rate exceeded 98%, detected by persuing the unreacted ε-caprolactone amount by infrared absorption spectrum measurement of samples periodically taken while keeping the temperature, 241.2 parts of methyl isobutyl ketone, 84 parts of diethanolamine and 53.4 parts of methyl isobutyl ketone solution of methyl isobutyl ketone diketimine of diethylenetriamine of 80% purity were added, reacted at 80° C. for 4 hours and then diluted with 140.9 parts of methyl isobutyl ketone to obtain a modified epoxy-polyamine resin with resin solid content of 75% and amine value of 56.7.

PREPARATION EXAMPLE 6

In a flask equipped with a stirrer, thermometer, nitrogen inlet pipe and reflux cooler were placed 340 parts of propylene oxide-modified bisphenol A diglycidyl ether with an epoxy equivalent of about 340 and total addition mole number of propylene oxide of 2–3, 342 parts of bisphenol A, 570 parts of bisphenol A diglycidyl ether with an epoxy equivalent of about 190 and 0.35 parts of dimethylbenzylamine and reacted at 160° C. until the epoxy equivalent reached 1,252. Then 241.2 parts of methyl isobutyl ketone, 84 parts of diethanolamine and 53.4 parts of methyl isobutyl ketone solution of methyl isobutyl ketone diketimine of diethylenetriamine of 80% purity were added, reacted at 80° C. for 4 hours and then diluted with 208.2 parts of methyl isobutyl ketone to obtain a modified epoxy-polyamine resin with resin solid content of 75% and amine value of 48.5.

Examples 1–3 and Comparative Examples 1, 2

To each of 5 kinds of base resin solution obtained in the above-mentioned Preparation Examples 1–6, methyl ethyl ketoxime-blocked isophorone diisocyanate was compounded so that the equivalent of the blocked isocyanate group becomes about the same as the equivalent of the total of primary hydroxyl group and primary amino group in the modified epoxy-polyamine resin.

Furthermore, a well stable emulsion with resin solid content of 30% was obtained by adding 1 part of polypropylene glycol (made by Sanyo Chemical Industries, Ltd., Sannix PP4000) and 1.6 parts of acetic acid per 100 parts by weight of solid content of the resin composition compounded as mentioned above and dispersing in water by warming to 60° C. and slowly adding deionized water while stirring.

This emulsion was placed in a flask capable of being operated under reduced pressure, treated by distillation under reduced pressure at 50° C. until methyl isobutyl ketone was substantially removed, and then readjusted with deionized water to resin solid content of 30%.

13 Parts of titanium white, 0.3 parts of carbon black, 3 parts of clay, 2 parts of dibutyltin oxide and 1 part of nonionic surface-active agent (trade name: Noigen 142B, made by Dai-ichi Kogyo Seiyaku Co., Ltd.) were added per 100 parts by weight of resin solid content of the water-based emulsion thus obtained, then the pigment dispersion was conducted by a ball mill until the particle size became less than 10 μm, and the emulsion was further diluted with deionized water to solid content of 20%.

Cationic electrodeposition coating was conducted by using 5 kinds of the diluted paints obtained as mentioned above by passing current under the condition of solid content concentration 20%, bath temperature 28° C., voltage 250V on a non-treated steel plate. After baking the electrodeposited plate at 160° C. for 20 minutes, evaluation of coating surface and anticorrosivity test were conducted. Resin compounding and test results are shown in the following Table 1.

TABLE 1

|  | Example | | | Comparative Example | |
|---|---|---|---|---|---|
|  | 1 | 2 | 3 | 1 | 2 |
| Resin compounding | | | | | |
| Base resin | | | | | |
| Kind (Preparation Example No.) | Prep. Ex. 1 | Prep. Ex. 2 | Prep. Ex. 4 | Prep. Ex. 5 | Prep. Ex. 5 |
| Solid content (parts) | 73.5 | 69.5 | 80.0 | 68.5 | 78.0 |
| Curing agent | | | | | |
| Kind (Preparation Example No.) | Prep. Ex. 3 | Prep. Ex. 3 | Prep. Ex. 3 | Prep. Ex. 3 | Prep. Ex. 3 |
| Solid content (parts) | 26.5 | 30.5 | 20.0 | 31.5 | 22.0 |
| Film thickness (μm) (*1) | 20 | 22 | 19 | 10 | 20 |
| Evaluation | | | | | |
| Coating surface condition (visual evaluation) | ○ | ○ | ○ | Δ~x pinholes appeared | ○ |
| Anticorrosivity (*2) | 1.3 | 1.5 | 1.4 | 1.2 | 4.0 |

Notes in Table 1 mean as follows.
(*1) Thickness of electrodeposited coating film when current was passed at 250 V for 3 minutes.
(*2) Cross-cut lines were cut in the electrodeposited coating film with a knife reaching to the ground surface, to which salt water spray tests were conducted according to the description of JIS Z-2371 for 480 hours and measured the width (mm) of rust and blister from the knife cut.

What is claimed is:

1. A resin composition for coating comprising a urethane-modified epoxy-polyamine resin (g) obtained by first reacting a diepoxide compound (a) selected from the group consisting of the compounds represented by the following general formulae (I) and (II)

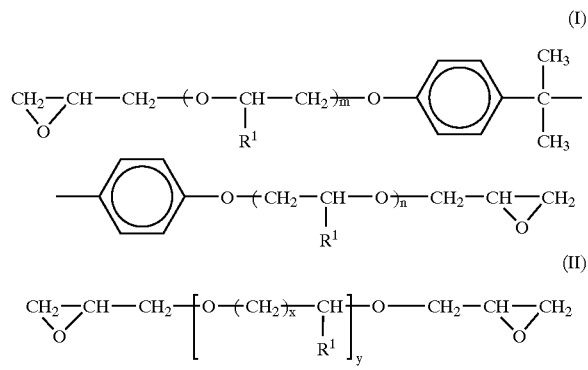

wherein
  $R^1$ represents a hydrogen atom or an alkyl group of 1–6 carbon atoms,
  m and n are respectively a number of 0 or more, and the sum of m and n is in the range of 1–20,
  x is an integer of 1–9, and
  y is a number of 1–50,
and a bisphenol A epoxy resin of an epoxy equivalent 170–500 with a bisphenol (b), reacting the epoxy resin (c) thus obtained with a cyclic ester (d) represented by the following general formula (III)

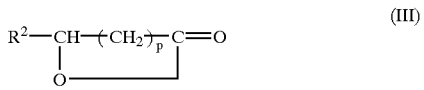

wherein
  $R^2$ represents a hydrogen atom or a methyl group, and
  p is an integer of 3–6,
reacting an amine compound containing active hydrogen with the modified epoxy resin (e) thus obtained, and further reacting a partially blocked isocyanate compound (h) with the modified epoxy-polyamine resin (f) thus obtained, said modified epoxy-polyamine resin (f) containing 3–40% by weight of alkylene oxide or alkylene glycol structural units originated from the diepoxide compound (a).

2. A composition set forth in claim 1 wherein the partially blocked isocyanate compound (h) and the modified epoxy-polyamine resin (f) are reacted in such a proportion that the solid content ratio of compound (h)/resin (f) becomes in the range of 1/20–1/1.

3. A resin composition for cationic electrodeposition paint comprising the composition set forth in claim 1.

4. A cationic electrodeposition coating bath comprising the composition set forth in claim 1.

5. An article coated by using the composition set forth in claim 1.

* * * * *